United States Patent Office 3,328,438
Patented June 27, 1967

3,328,438
POLYMERIZATION OF HALOGENATED FATTY ACIDS AND ESTERS THEREOF USING CLAY CATALYSTS
Raymond F. Paschke, Anoka, Minn., assignor to General Mills, Inc., a corporation of Delaware
No Drawing. Filed Feb. 23, 1962, Ser. No. 175,333
1 Claim. (Cl. 260—407)

This invention relates to a process of manufacturing polymeric acids from halogenated fatty acids. More particularly, it relates to the polymerization of halogenated fatty acids or the derivatives thereof by clay catalysis.

Polymerized fatty acids, their metallic salts, esters and other derivatives find an ever-increasing variety of important applications. The metallic salts are valuable as low viscosity lubricants, as emulsifiers for emulsion polymerization and in grease compositions. The esters are employed as low viscosity lubricants and for stabilizing synthetic resin emulsions. Polyester resins based on a proportion of dimeric acid give glass-fibre laminates of high flexural strength and excellent resistance to heat and chemical attack. Polyurethane foams having a very fine and uniform pore structure can be obtained by reacting isocyanates with the dimeric acid-based polyesters. Linear polyamides can be produced by reacting the dimeric acids with polyamines such as ethylene diamine. These polyamides have wide industrial applications as coating resins, adhesives, curing agents for epoxy resins and ingredients in thixotropic paints.

In the past, the production of polymerized polycarboxylic fatty acids has required starting materials which were rich in polyunsaturated components, such as drying and semi-drying vegetable and marine oils, or were rich in monounsaturated components, such as commercial oleic acid and the mixed fatty acids derived from animal fats or vegetable oils of low iodine value (i.e., olive, palm and peanut oil acids). One of the earliest methods of preparing the polymeric fatty acids was the prolonged heating at elevated temperatures, for instance in excess of 260° C., of polyunsaturated fatty acids. Monounsaturated materials, such as methyl oleate, were dimerized to a limited extent when subjected to very severe thermal treatment. The prior literature also advocated the use of catalysts, such as fuller's earth or bentonite, preferably acid treated, or stannic chloride, to permit the use of lower temperatures and/or shorter periods of time in the thermal process. Any saturated fatty acids present in the starting material do not enter into the polymerization process and are distilled from the polymeric products.

The commercially available polymeric fatty acids are those prepared from the $C_{18}$ mono- and polyunsaturated fatty acids, oleic, linoleic, linolenic and the like. No commercial method has been heretofore available to prepare polymeric fatty acids from saturated fat acids. Such a method would be highly advantageous since (1) readily available saturated fatty acids could be used to prepare the polymeric products, (2) tailor made polymers could be prepared from saturated fatty acids of almost any chain length, and (3) the monomer, distilled from the polymeric products derived from the mono- and polyunsaturated fatty acids, could be utilized to further increase the yield of the polymeric product.

It has now been discovered that polymeric fat acids and the ester derivatives thereof can be prepared by polymerizing halogenated fatty acids or esters in the presence of clays. The starting materials, the halogenated fatty acids or esters may be prepared from saturated or unsaturated fatty acids or esters of any desired chain length. The polymeric fat acids or esters are useful for the purposes enumerated hereinabove.

Therefore, it is an object of this invention to provide a new method for the preparation of polymeric fat acids or esters.

Another object of the invention is to provide such a method using halogenated fatty acids or esters.

These and other objects will become apparent from the following detailed description.

Broadly, the process of the present invention comprises the polymerization of halogenated fatty acids or esters thereof at elevated temperatures and in the presence of clays for a time sufficient to produce polymeric fat acids or esters.

The halogenated fatty acid starting materials are prepared from either saturated or unsaturated fatty acids and contain from about one to about two halogen atoms per molecule of fatty acid. The halogen is preferably chlorine or bromine. Mixtures of said acids containing different halogen atoms may also be used.

Saturated fatty acids which may be halogenated are those which contain from about 4 to 32 carbon atoms. Suitable saturated fatty acids include branched and straight chain acids such as butyric, valeric, caproic, enanthic, caprylic, pelargonic, capric, lauric, myristic, palmitic, stearic, arachidic, behenic, lignoceric and lacceroic. Valeric and most of the even-carbon acids are found in natural products. Other odd-carbon acids as well as even-carbon acids can be synthesized by methods well known in the art. One of the preferred methods of synthesis is the reduction of an acid or its alkyl ester to the corresponding alcohol, conversion of this alcohol to the alkyl iodide and then to the corresponding cyanide, which is hydrolyzed to give an acid containing one carbon atom more than the original acid. This procedure can be repeated to add any number of carbon atoms to the original acid. Another method is the step wise degradation of an acid to its next lower homologue. This can also be accomplished by well known procedures. See Ralston, "Fatty Acids and Their Derivatives" (1948), published by John Wiley & Sons, Inc., pages 14–18. The acids can be halogenated in any known manner such as by direct reaction with the free halogen. This halogenation is catalyzed by light as well as by phosphorus, phosphorus trichloride and phosphorus tribromide. If one equivalent of halogen is used per mole of acid, the substitution will normally take place on the α or 2 carbon atom of the acid. If the halogenation is continued, any of the hydrogens attached to methylene groups may be replaced by the halogen. Mixtures of the above described saturated fatty acids may be halogenated by this procedure.

Monoethylenic fatty acids of from about 5–32 carbon atoms can also be halogenated to provide the starting materials for the process of the present invention. Suitable acids of this type include branched and straight chain acids such as 3-pentenoic, hydrosorbic, obtusilic, lauroleic, linderic, myristoleic, tsuzuic, palmitoleic, petroselinic, oleic, elaidic, vaccenic, 9-eicosenic, 11-eicosenic, erucic, cetoleic and ximenic acid. Most of the naturally occurring acids have an even number of carbon atoms. Odd-carbon acids and various even-carbon acids can be synthesized by known methods and used to prepare the halogenated starting materials. Halogenation of the monoethylenic acids can be accomplished by direct reaction with free halogen or by addition of a hydrogen halide to the unsaturated carbon-to-carbon linkage. The first method yields halogenated fatty aids having two halogen atoms per molecule while the second method yields monohalogenated saturated fatty acids. These reactions can be carried out by well known procedures.

Polyunsaturated fatty acids can also be used to prepare the halogenated starting materials. Thus diethylenic acids can be hydrohalogenated to provide saturated fatty acids which contain two halogen atoms per molecule. It is also understood that mixtures of halogenated acids prepared by different methods can be polymerized by the present process. For example, equal parts of halogenated stearic acid containing one halogen atom per molecule of acid and hydrohalogenated oleic acid can be polymerized to provide polymeric acids wherein the carbon-carbon linkages of the acids can be in different positions. Thus, the halogen of the oleic acid would be in the 9 or 10 position and that of stearic acid in the α or 2 position. Since these positions would be the most reactive, the linkages of the polymeric product would probably be between two molecules of the oleic acid at the 9 and 10 positions, between two molecules of the stearic acid at the 2 and 3 positions or between a molecule of oleic acid at the 9 and 10 position and a molecule of stearic acid at the 2 and 3 position. In this way a variety of polymeric products can be obtained. It is also understood that the polymerization of acids containing more than one halogen atom per molecule will result in more highly polymerized products.

The lower alkyl esters of the above described halogenated acids may also be polymerized by the process of the present invention. Illustrative thereof, are the methyl through octyl esters of said acids.

Any clay may be used in the practice of the present invention. The amount of clay used is not critical, and may, therefore, range from about 1 to 25% by weight based on the total weight of the reaction mixture. An amount of 10 to 20% is preferred.

A small amount of an acid scavenger, such as CaO or $Na_2CO_3$, may be added to the reaction mixture of the clay and halogenated acid or ester to neutralize any halogen halide (HX) liberated during the polymerization.

The polymerization reaction is carried out by heating a mixture of the halogenated acids and clay at temperatures high enough to effect polymerization. Preferably, the reaction is carried out at temperatures in the range of from about 180° to 270° C. It is particularly preferred to use a reaction temperature of from about 180° to 235° C. The time of reaction is not critical. It is only necessary that the reaction be continued for a sufficient length of time to produce the desired polymeric products. The time of reaction will depend upon several factors—i.e., temperature, amount of clay present, and the particular halogenated acids being polymerized. Normally the reaction will be complete in about 1 to 10 hours and is usually complete within about 1 to 6 hours.

In the above description and the examples and claims to follow, the terms "monomer," dimer," and "trimer" and "residual dimer" have the following meanings: "monomer"—material not polymerized and which is largely distillable from the polymeric product; "dimer"—the simplest polymer containing two fatty acid molecules joined by carbon-carbon linkages; "trimer"—all polymer molecules larger than "dimer"; and "residual dimer"—the material remaining after the monomer has been distilled off under high vacuum. The "dimer/trimer ratio" ($D/T$) means the weight ratio of "dimer" to "trimer" in the "residual dimer."

The following examples will serve to illustrate further my invention but are not to be taken as in any way limiting the broader aspects thereof.

*Example I*

One hundred seventy grams of partially chlorinated pure stearic acid containing 15.4% chlorine were heated with 38 grams of "Filtrol" grade I (an acid activated mineral montmorillonite clay) under nitrogen for 3 hours at 190° C. The volatiles were then vented and the clay was filtered from the reaction mixture. Laboratory distillation of the fatty material yielded 63% monomer and 37% residual dimer. The monomer had the following analysis:

Acid No. _____ 156.4
Sap. No. _____ 197.0
Percent Cl _____ 1.8

The residual dimer had the following anlysis:

Acid No. _____ 130.3
Sap. No. _____ 188.7
Percent Cl _____ 0.80
Percent monomer _____ 8.6
Percent dimer _____ 49.6
Percent trimer _____ 41.9
$D/T$ _____ 1.18

*Example II*

Two hundred grams of pure stearic acid were heated with 50 grams of "Filtrol" grade I under nitrogen for 3 hours at 190° C. The volatiles were then vented and the clay was filtered from the reaction mixture. Only 0.3% residual dimer was obtained.

The data of Examples I and II show that polymeric fatty acids can be prepared by heating halogenated fatty acids in the presence of clay but cannot be prepared from saturated fatty acids which have not been halogenated.

*Example III*

Two hundred ninety two grams of caprylic acid were chlorinated without solvent for two hours using a flood light (300 watts) held 2 to 4 inches from the flask surface. The maximum temperature reached was 84° C. Excess $Cl_2$ and HCl were blown out by passing nitrogen through the reaction flask. The residue weighed 327 grams and had an acid number of 344.2 and contained 11.0% by weight chlorine.

Two hundred eighty grams of the partially chlorinated acids were heated under nitrogen with 70 grams of "Filtrol" grade I at 190° C. for 3 hours. The catalyst was filtered off and the reaction mixture laboratory distilled, yielding 85% monomer and 15% residual dimer. The residual dimer was converted to the methyl esters. Distillation of the esters yielded distinct monomeric, dimeric and trimeric fractions.

*Example IV*

Another batch of caprylic acid was chlorinated in the same manner as set forth in Example III. However, the chlorinated product was stripped of unchlorinated material by distillation. The residue acids contained slightly more than one chlorine atom per molecule of acid. One hundred thirty grams of the residue acids and 32.5 grams of "Filtrol" grade I were heated, filtered and distilled in the same manner as the acids of Example III. There was obtained 45% monomer and 55% residual dimer. The latter fraction had an acid number of 186.9 and a saponification number of 356.7.

*Example V*

Three hundred three grams of distilled monomer from the clay catalyzed polymerization of tall oil fatty acids having the following properties:

Acid No. _____ 173.8
Sap. No. _____ 184.1
Percent unsap. _____ 6.5 were chlorinated for 3 hours and 10 minutes under a flood light. The maximum temperature reached was 115° C. The chlorinated monomer had an acid No. of 195.1 and contained 22% by weight chlorine. Two hundred fifty six grams of the chlorinated monomer were heated with 50 grams of "Filtrol" grade I under nitrogen for 3 hours at 190° C. Filtration and laboratory distillation of the reaction mixture yielded 65% monomer and 35% residual dimer. The residual dimer had the following analysis:

Acid No. _____ 120.7
Percent Cl _____ 1.6

| | |
|---|---|
| Percent monomer | 14.5 |
| Percent dimer | 17.1 |
| Percent trimer | 68.4 |
| $D/T$ ratio | 0.25 |

Examples III–V further show that polymeric fatty acids can be prepared from halogenated fatty acids. Additionally, Example IV shows that residual dimer content is increased by stripping the chlorinated starting material of any unchlorinated fatty acid monomer. Example V shows that the monomer, remaining after polymerization of fatty acid mixtures containing a substantial proportion of unsaturated acid, can be halogenated and polymerized to further increase the total yield of polymeric fatty acids.

The foregoing description and examples of my invention are not to be taken as limiting since many variations may be made by those skilled in the art without departing from the spirit or the scope of the following claim.

The embodiments of the invention in which an exclusive property or privilege is claimed are defined as follows:

The method of polymerizing a fatty material, the carbon chain of which is saturated, selected from the group consisting of chlorinated fatty acids containing from about 4 to 32 carbon atoms, brominated fatty acids containing from about 4 to 32 carbon atoms and the $C_1$ to $C_8$ alkyl esters of said chlorinated and brominated fatty acids, the said fatty material containing from about 1 to about 2 atoms of chlorine and bromine per molecule of fatty material, which comprises heating, at temperatures of from about 180° to 270° C., a reaction mixture comprising said fatty material and about 1 to 25% by weight of an acid activated mineral montmorillonite clay catalyst based on the total reaction mixture for a period sufficient to effect polymerization of said fatty material.

References Cited

UNITED STATES PATENTS 2,277,252   3/1942   Pollin et al. _____ 260—407

FOREIGN PATENTS 863,549   1/1953   Germany.

CHARLES B. PARKER, *Primary Examiner.*

DANIEL D. HORWITZ, *Examiner.*

ANTON H. SUTTO, *Assistant Examiner.*